Figure 1:
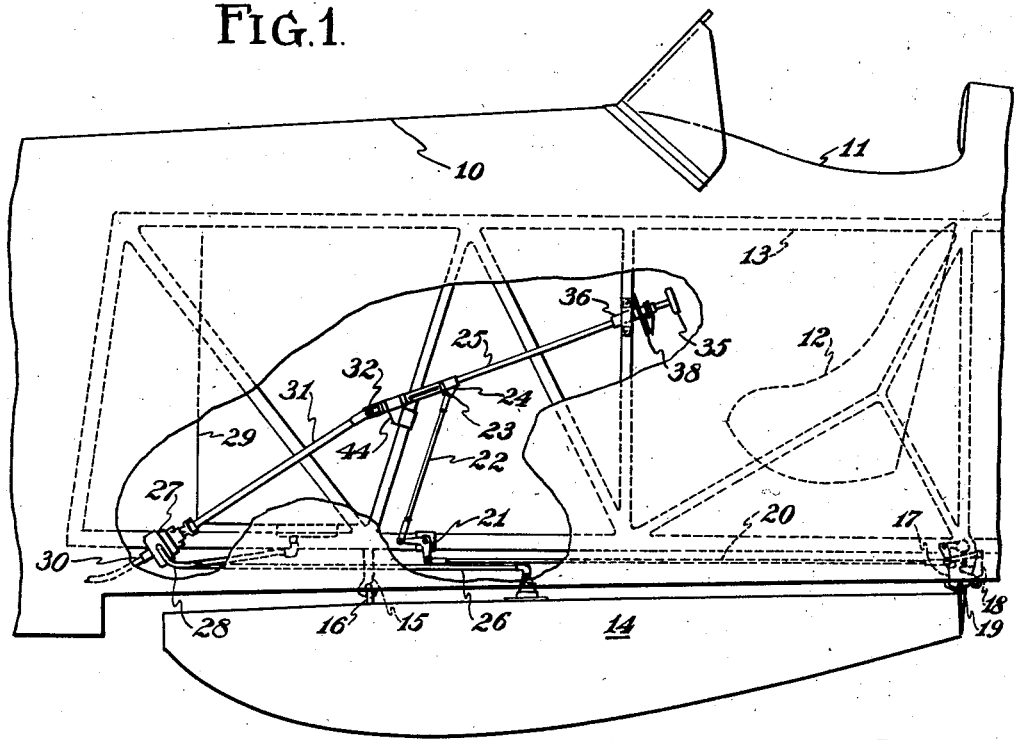

Oct. 9, 1934.  E. L. NOONAN  1,976,456
COMBINATION FUEL VALVE AND TANK RELEASE
Filed Dec. 30, 1933

INVENTOR.
EDMUND L. NOONAN.
BY
ATTORNEYS.

Patented Oct. 9, 1934

1,976,456

UNITED STATES PATENT OFFICE 1,976,456

COMBINATION FUEL VALVE AND TANK RELEASE

Edmund L. Noonan, Dorchester, Mass., assignor to Curtiss Aeroplane & Motor Company, Inc., a corporation of New York Application December 30, 1933, Serial No. 704,631

8 Claims. (Cl. 244—1)

This invention relates to improvements in fuel systems for aircraft, and is particularly concerned with valve and releasing means for detachable fuel tanks.

It has been the practice in certain types of aircraft to provide auxiliary fuel tanks, usually located in the belly of the airplane fuselage, which are arranged to be released in case of emergency. Such tanks are provided in addition to the main fuel supply tank within the fuselage, or in other parts of the aircraft structure. Under certain emergency flight conditions it may be desirable to release such tanks to lighten the weight of the aircraft, or, when a mission of short duration is to be accomplished, the auxiliary tank may be removed from the aircraft in order to carry a greater load therewithin. With the many control devices now placed in the cockpit of an airplane, it becomes increasingly necessary to simplify and coordinate all related controls so that the pilot is not unduly burdened. The normal releasable tank installation includes a handle for releasing the tank in case of emergency, and a valve for connecting the fuel lines of the tank to the engine gasoline circuit. Such valve is usually coordinated with a unitary valve serving to connect one or more main tanks and/or the reserve tanks to the system, and the valve is also provided with an "off" position in which all tanks are disconnected from the engine fuel system.

An object of this invention is to coordinate with a fuel valve, means for releasing a detachable auxiliary gasoline tank.

A further object is to so arrange the unitary mechanism that operation of the control member in one plane serves to control the flow of fuel from one or more of the tanks to the engine system, while movement of said member in a second plane entirely divergent from said first plane serves to operate the mechanism which releases the detachable tank.

A further object is to simplify and coordinate related control mechanisms to give the pilot a lesser number of control elements within the cockpit to nevertheless accomplish all necessary functions.

A continued reading of the specification and consideration of the drawing will bring forth other objects.

Figure 2:
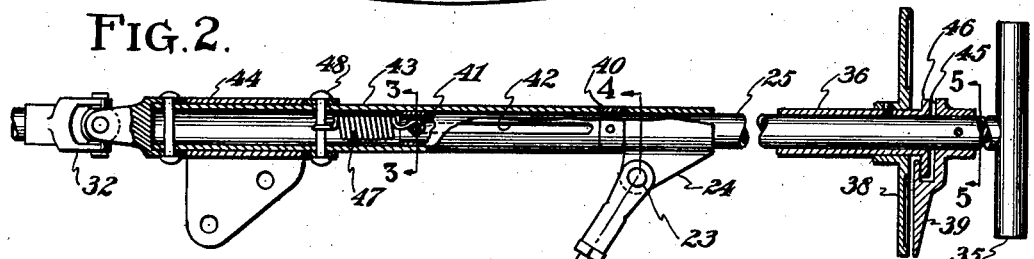
Figure 3:
Figure 4:
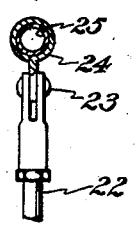
Figure 5:
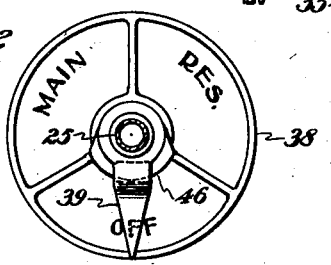

In the drawing, wherein similar numbers indicate similar parts:

Fig. 1 is a fragmentary side elevation of an airplane fuselage, partly broken away, to show the mechanism of this invention;

Fig. 2 is an enlarged elevation, partly in section, showing a portion of the mechanism; and Figs. 3, 4 and 5 are sections, respectively, on the lines 3—3, 4—4 and 5—5 of Fig. 2.

The airplane fuselage 10 has a normal pilot's cockpit 11, a seat 12 being conveniently located therein accessible to the various aircraft controls, not shown. The fuselage includes a skeleton framework 13 which, in addition to its structural functions, supports on its lower side, an auxiliary fuel tank 14. The lower surface of the tank 14 lies in the airstream, while the upper surface thereof is spaced from the lower surface of the fuselage by a slight distance. A forwardly located hook 15 attached to the framework 13, engages an eye 16 carried by the tank. The rearward end of the tank is supported by a releasing mechanism including a plate 17 mounted on the framework 13 and having pivoted thereto a dog 18 which engages a member 19 of the tank. A rod 20, connected to the dog 18, serves to release the latter, whereby the rear end of the tank 14 may drop clear of the aircraft. Upon release of the rear end of the tank, the eye 16 readily disengages the hook 15, whereby the whole tank may drop clear. A rod 20 extends forwardly to a bell crank 21 pivoted on the fuselage framework 13, and a second rod 22 extends upwardly to be pivoted at 23 to a collar 24 loosely mounted on a shaft 25.

The tank 14 is provided with a fuel line 26 (which fractures when the tank is dropped) extending forwardly to a unit valve 27, the valve also having a connection 28 leading to the main fuel tank 29 within the fuselage. A connection 30 extends forwardly to the engine fuel system, not shown. The valve is turnable to connect either the main tank 29 or the auxiliary or reserve tank 14 to the engine fuel system, the valve also being provided with an "off" position wherein both fuel tanks are disconnected. Turning of the valve is accomplished by a rotatable element 31 extending upwardly and rearwardly to a universal joint 32.

It will be apparent from the above, that to coordinate the control of the releasing mechanism for the auxiliary tank 14 and to adjust the valve 27, translation of the collar 24 will effect releasing of the auxiliary tank, while turning of the universal joint 32 will effect switching of the fuel flow from one or the other tank to the engine. The means provided for this purpose is more particularly shown in Figs. 2 to 5, inclusive.

A control handle 35 is carried by the shaft 25, which is borne in a bearing 36 fixedly mounted in the framework 13. Said bearing may be provided with a dial 38 having marked thereon indicia showing the positions of the valve 27. A pointer 39 rotatable with the handle 35 registers opposite the several indicia. The shaft 25 carries the collar 24 loosely thereon, and a collar 40 encircling said shaft and fixed thereto, serves to translate the collar upon translation of the handle 35 and the shaft 25. The shaft is provided with a cross pin 41, engaging within slots 42 formed in a sleeve 43. The sleeve, in turn, is attached to the universal joint 32, so that the latter may rotate therewith. For holding the sleeve in its proper position, a bearing 44 encircles same and is in turn attached to the framework 13.

In operation, the handle 35 may be turned which, by means of the pin 41 engaging the slots 42, turns the sleeve 43, the universal joint 32, and thus adjusts the valve 27 to one of its several positions. By pulling the handle 35 outwardly, no rotation of the valve is effected, but the collar 24 is translated to operate the mechanism for dropping the auxiliary tank 14. Thus, the gasoline flow and release of the auxiliary tank is accomplished by the same instrumentality. It will be noted that distinctly different movements are required for accomplishing every function, so that confusion is minimized and operation of the tank releasing mechanism by inadvertence is unlikely. To avoid the possibility of inadvertent releasing of the auxiliary tank, a notch 45 is provided in the indicating pointer 39, this notch being engageable with a shoulder 46 formed on the bearing 36 in all but certain positions of rotative adjustment of the handle 35. It is thereby impossible to pull the handle for tank releasing when, as shown, the valve 27 is turned to the "off" position. It will only be possible to release the tank by withdrawal of the handle 35 when the valve is turned so that flow connection is made between either the main or the auxiliary tank and the engine system.

A tension spring 47 connects the cross pin 41 to a rivet 48 or the like, passing through the sleeve 43, to resist outward pulling of the handle 35 and to return it to an inward position after it has been pulled out.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft having a fuel tank normally connected by a tube to an engine of said aircraft, a valve in said tube for establishing or causing the cessation of fuel flow through said tube, releasable means holding said tank to said aircraft, and a unitary control device operable in one sense to actuate said valve, and operable in another sense to actuate said releasable means.

2. In aircraft having a releasable fuel tank and a valve for establishing or causing the cessation of fuel flow from said tank to an engine of said aircraft, a unitary control device operable to selectively establish or cause the cessation of said fuel flow, or to release said fuel tank from said aircraft.

3. In aircraft, a valve and a releasing mechanism, both provided for the operation of a fuel tank of said aircraft, and a control element for selectively operating either said valve or said releasing mechanism.

4. In aircraft, a main fuel tank, an auxiliary dropable fuel tank, valve means for establishing fuel flow from one or the other tank, a control element for operating said valve adapted to be turned for the selective operation thereof, releasing mechanism for dropping said auxiliary tank, and means responsive to translation of said control element for actuating said releasing mechanism.

5. In aircraft having a dropable fuel tank, a control element adapted to be rotated for establishing fuel flow from said tank to an engine of said aircraft, and said element being adapted to be translated to effect dropping of said tank.

6. In an aircraft control device, in combination, a turnable member having a longitudinal slot therein, a translatable and rotatable operating member having a pin engaging said slot whereby said two members rotate with each other but are translatable with respect to each other, and a collar borne on said operating member for rotation with respect thereto and for translation therewith.

7. In aircraft having a dropable fuel tank, a control element therefor organized for rotation to govern the flow of fuel from said tank, and organized for translation to drop said tank.

8. In aircraft having a dropable power plant accessory, a control element therefor operable in one plane for effecting an operative connection between said accessory and the power plant, and operable in another plane for effecting the dropping of said accessory.

EDMUND L. NOONAN.